United States Patent
Shimomura (10) Patent No.: US 8,795,918 B2
(45) Date of Patent: Aug. 5, 2014

(54) SINGLE FUEL CELL AND FUEL CELL STACK

(75) Inventor: Keita Shimomura, Tokyo (JP)

(73) Assignee: Toppan Printing Co., Ltd. (JP)

(*) Notice: Subject to any disclaimer, the term of this patent is extended or adjusted under 35 U.S.C. 154(b) by 348 days.

(21) Appl. No.: 12/767,700

(22) Filed: Apr. 26, 2010

(65) Prior Publication Data

US 2010/0273084 A1    Oct. 28, 2010

(30) Foreign Application Priority Data

Apr. 27, 2009   (JP) .................................. 2009-107407

(51) Int. Cl.
     *H01M 8/24*      (2006.01)

(52) U.S. Cl.
     USPC ............ 429/457; 429/456; 429/454; 429/452

(58) Field of Classification Search
     CPC .............................. H01M 8/24; H01M 8/2405
     USPC .................. 428/452; 429/452, 457, 456, 454
     See application file for complete search history.

(56) References Cited

U.S. PATENT DOCUMENTS

| | | | |
|---|---|---|---|
| 6,884,536 B1* | 4/2005 | Hatoh et al. | 429/433 |
| 2004/0058223 A1* | 3/2004 | Shibata et al. | 429/38 |
| 2005/0191539 A1* | 9/2005 | Yoshioka et al. | 429/38 |
| 2007/0087256 A1* | 4/2007 | Hirashige et al. | 429/38 |

FOREIGN PATENT DOCUMENTS

| | | | | |
|---|---|---|---|---|
| JP | 2007-066767 | | 3/2007 | |
| JP | 2008-047293 | | 2/2008 | |
| JP | 2008047293 | A * | 2/2008 | |

* cited by examiner

*Primary Examiner* — Gary Harris
(74) *Attorney, Agent, or Firm* — Squire Sanders (US) LLP (57) ABSTRACT

The single fuel cell of the present invention includes an MEA (membrane electrode assembly), GDLs (gas diffusion layers) and separators, a pair of catalyst layers being provided on both surfaces of a polymer electrolyte membrane in the MEA, a pair of the GDLs being disposed opposite the pair of catalyst layers of the MEA, the separators including gas flow channels of an air electrode and a fuel electrode, the MEA and the pair of the GDLs being interposed between the separators, and at least one of an area of the GDL of the air electrode and an area of the GDL of the fuel electrode being smaller than an effective area of the gas flow channel of the separator, which is an inner area specified by tracing and connecting outermost edge parts of a groove of the gas flow channel of the separator.

13 Claims, 5 Drawing Sheets

SINGLE FUEL CELL AND FUEL CELL STACK

CROSS REFERENCE TO RELATED APPLICATION

This application is based on and claims the benefit of priority from the Japanese Patent Application number 2009-107407, filed on Apr. 27, 2009, the entire contents of which are incorporated herein by reference.

BACKGROUND OF THE INVENTION

1. Field of the Invention

The present invention relates to a single fuel cell and a fuel cell stack. In particular, the present invention relates to a single cell and a cell stack which improve power generation performance of a PEFC (polymer electrolyte fuel cell) or PEMFC (proton exchange membrane fuel cell).

2. Description of the Related Art

The fuel cell is a power generation apparatus. In the fuel cell, a fuel gas such as hydrogen and an oxidant gas such as air are electrochemically reacted to convert chemical energy into electric energy, thereby generating power. The fuel cell has advantages such as high efficiency and a low environmental burden. Among others, because a PEFC (or PEMFC) in which a polymer is used as electrolyte can be operated at a low temperature, the PEFC (or PEMFC) is expected to be used as a household or in-vehicle power supply.

The PEFC (or PEMFC) includes a membrane electrode assembly (MEA) in which electrode catalyst layers are provided in both surfaces of a polymer electrolyte membrane. As to a method for producing the membrane electrode assembly, for example, a transfer sheet is used as a base material, catalyst ink is applied onto the transfer sheet and dried to form electrode catalyst layers, which are in turn hot-pressed on the transfer sheet, whereby the electrode catalyst layers are caused to adhere to both the surfaces of the polymer electrolyte membrane. In another method, a gas diffusion layer (GDL) is used as the base material, the catalyst ink is applied onto the gas diffusion layer to form the electrode catalyst layers, and the gas diffusion layer is hot-pressed, whereby the electrode catalyst layers are caused to adhere to both the surfaces of the polymer electrolyte membrane.

The produced membrane electrode assembly is incorporated in the single fuel cell of the PEFC (or PEMFC). In an internal structure of the single fuel cell, the gas diffusion layer is provided outside the membrane electrode assembly, and separators adhere so as to sandwich the gas diffusion layer and the membrane electrode assembly therebetween. The separator includes a gas flow channel. The separator plays a role in mainly supplying a fuel gas that is hydrogen to a fuel electrode (anode) through the gas flow channel and mainly supplying an oxidant gas that is oxygen and air to an air electrode (cathode) through the gas flow channel. Because the separator also serves as a collector that collects a current passed by an electromotive force generated in the membrane electrode assembly, the separator needs to be made of a conductive material. When the gas supplied to the anode and the gas supplied to the cathode are mixed together, an electrochemical reaction is disturbed in the electrodes, and thus it is necessary to seal the separator such that the gas supplied to the anode and the gas supplied to the cathode are not mixed together. Therefore, a gasket is disposed such that the polymer electrolyte membrane located in an outer peripheral portion of the membrane electrode assembly is covered therewith.

In the in-vehicle or household practical machine, the fuel cell refers to the stacked fuel cell in which plural single fuel cells are connected in series in order to secure large current.

In the single fuel cell, the membrane electrode assembly is opposite the gas diffusion layer. The gas diffusion layer is disposed such that the separator flow channel is covered therewith. This is because the fuel gas and oxidant gas conveyed through the separator flow channels pass through the gas diffusion layer to improve diffusivity, and therefore the fuel gas and oxidant gas easily enter the dense structure of the electrode catalyst layer.

However, occasionally the gas diffusion layer drops in the separator flow channel to cause damage, when the gas diffusion layer adheres to the separator while deviating from the separator due to a design error or a manufacturing variation. Therefore, for example, JP-A-2008-047293 discloses a fuel cell in which one of the separator flow channels is inclined with respect to the other separator flow channel in order to prevent the damage.

When a non-overlapping portion exists because the anode differs from the cathode in a shape of the gas diffusion layer, occasionally durability of the fuel cell is degraded due to a tightening load of the single fuel cell. JP-A-2007-066767 discloses a fuel cell in which the non-overlapping portion is located in a groove portion adjacent to a rib of the separator.

<Patent document 1>: JP-A-2008-047293
<Patent document 2>: JP-A-2007-066767

The fuel gas that is the hydrogen is caused to flow in the anode of the single fuel cell while the oxidant gas that is the oxygen and air is caused to flow mainly in the cathode, and the current is taken out, whereby water is generated by an electrode reaction in the cathode. The water is essential to produce proton conduction of the polymer electrolytes of the anode and cathode. However, when a large amount of water remains in the membrane electrode assembly, particularly in the cathode, the gas diffusivity is degraded to reduce fuel efficiency, which causes a problem in that power generation performance of the single fuel cell is reduced. The phenomenon is called flooding.

Further, the water generated in the cathode remains in the gas flow channel of the separator to disturb the gas supply, which causes the problem in that the power generation performance of the single fuel cell is reduced. The phenomenon is called plugging.

As described above, in the membrane electrode assembly, when the water generated by the electrode reaction exists too much or too little in the cathode catalyst layer, the power generation performance of the single fuel cell is reduced. Additionally, the problem of the flooding or plugging is generated in the anode by reverse diffusion of moisture in the gas supplied to the anode or the water from the cathode.

For example, the following measures against flooding are studied. That is, a water-repellent treatment is performed to the gas diffusion layer base material in order to improve water discharge, a mixture called MPL (Micro Porous Layer) in which water-repellent resin such as PTFE (polytetrafluoroethylene) is added to carbon particles is applied onto the electrode catalyst layer side of the gas diffusion layer, and a large amount of gas flows in the gas flow channel to discharge the water to the outside of the single fuel cell. However, unfortunately the flooding is not completely prevented, even if the water-repellent treatment is performed to the gas diffusion layer base material, or even if the MPL is provided to the gas diffusion layer. When a large amount of oxidant gas flows at one time, unfortunately cost is increased because an auxiliary machine is required, or the oxidant gas runs to waste.

As to the measure against plugging, similarly to the measure against flooding, a large amount of gas flows in the gas flow channel or the water-repellent treatment is performed to the separator flow channel. However, the cost is increased.

SUMMARY OF THE INVENTION

The present invention provides a single fuel cell and a fuel cell stack, in which the excessive water is easily discharged to prevent the flooding while the water in the cathode catalyst layer and anode catalyst layer of the membrane electrode assembly and the polymer electrolyte membrane maintains the proton conductivity, and the water remaining in the separator flow channel is easily discharged to the outside of the single fuel cell to prevent the plugging.

A first aspect of the present invention is a single fuel cell having a membrane electrode assembly, gas diffusion layers and separators, a pair of electrode catalyst layers being provided on both surfaces of a polymer electrolyte membrane in the membrane electrode assembly, a pair of the gas diffusion layers being disposed opposite the pair of electrode catalyst layers of the membrane electrode assembly, the separators including gas flow channels of an air electrode and a fuel electrode, the membrane electrode assembly and the pair of the gas diffusion layers being interposed between the separators, and at least one of an area of the gas diffusion layer of the air electrode and an area of the gas diffusion layer of the fuel electrode being smaller than an effective area of the gas flow channel of the separator, which is an inner area specified by tracing and connecting outermost edge parts of a groove of the gas flow channel of the separator.

A second aspect of the present invention is the single fuel cell according to the first aspect of the present invention, wherein, X is the distance closest to the gas diffusion layer from the outer circumference of the effective area of the gas flow channel of the separator, the distance X falls within a range of 50%×(a groove width of the gas flow channel located outermost the effective area of the gas flow channel)≤X≤200%×(the groove width of the gas flow channel located outermost the effective area of the gas flow channel).

A third aspect of the present invention is the single fuel cell according to the second aspect of the present invention, wherein the groove width of the gas flow channel located at an outermost area of the effective area of the gas flow channel ranges from 0.1 mm to 5 mm.

A fourth aspect of the present invention is the single fuel cell according to the third aspect of the present invention, wherein the gas flow channel of the separator has a uniform groove width from a starting point of the gas flow channel to a terminal point thereof.

A fifth aspect of the present invention is the single fuel cell according to the fourth aspect of the present invention, wherein the gas flow channel of the separator is formed into a serpentine shape.

A sixth aspect of the present invention is a fuel cell stack having the plurality of single fuel cells according to fifth aspect of the present invention, wherein the single fuel cells are stacked in series.

A seventh aspect of the present invention is the single fuel cell according to the first aspect of the present invention, wherein, each the gas diffusion layer and the effective area of the gas flow channel of the separator is rectangular in shape, X is a distance closest to the gas diffusion layer from one of the four sides of the outer circumference of the effective area of the gas flow channel of the separator, the distance X falls within a range of 50%×(a groove width of the gas flow channel located outermost the effective area of the gas flow channel)≤X≤200%×(the groove width of the gas flow channel located outermost the effective area of the gas flow channel).

An eighth aspect of the present invention is the single fuel cell according to the seventh aspect of the present invention, wherein the groove width of the gas flow channel located at an outermost area of the effective area of the gas flow channel ranges from 0.1 mm to 5 mm.

A ninth aspect of the present invention is the single fuel cell according to the eighth aspect of the present invention, wherein the gas flow channel of the separator has a uniform groove width from a starting point of the gas flow channel to a terminal point thereof.

A tenth aspect of the present invention is the single fuel cell according to the ninth aspect of the present invention, wherein the gas flow channel of the separator is formed into a serpentine shape.

An eleventh aspect of the present invention is a fuel cell stack having the plurality of single fuel cells according to the tenth aspect of the present invention, wherein the single fuel cells are stacked in series.

The present invention provides a single fuel cell and a fuel cell stack, in which the excess water is easily discharged to prevent the flooding while the water in the cathode catalyst layer and anode catalyst layer of the membrane electrode assembly and the polymer electrolyte membrane maintains the proton conductivity, and the water remaining in the separator flow channel is easily discharged to the outside of the single fuel cell to prevent the plugging.

DESCRIPTION OF REFERENCE NUMERALS AND SIGNS (SYMBOLS)

1: polymer electrolyte membrane
12: membrane electrode assembly
2: cathode catalyst layer
3: anode catalyst layer
4: cathode gas diffusion layer
5: anode gas diffusion layer
6: air electrode (cathode)
7: fuel electrode (anode)
8: gas flow channel
9: cooling water flow channel
10: separator
11: rib
13: effective area of gas flow channel
14: gas inlet port
14': joint part of gas inlet port
15: gas outlet port 15': joint part of gas outlet port
16: minimum gas diffusion layer
17: maximum gas diffusion layer
18: enlarged region
19: actual gas diffusion layer
20: single fuel cell
A: groove width of gas flow channel located in outermost portion of effective area of gas flow channel
B: 50%×A (groove width of gas flow channel located in outermost portion of effective area of gas flow channel)
C: 200%×A (groove width of gas flow channel located in outermost portion of effective area of gas flow channel)
D: gas flow
E: flow from positive pressure to negative pressure

DESCRIPTION OF PREFERRED EMBODIMENTS

A membrane electrode assembly and a single fuel cell according to an embodiment of the invention will be described below. The invention is not limited to the following embodiment, but various design changes and modifications can be made based on the knowledge of those skilled in the art without departing from the scope of the invention.

A single fuel cell 20 according to an embodiment of the invention will be described.

Figure 1:
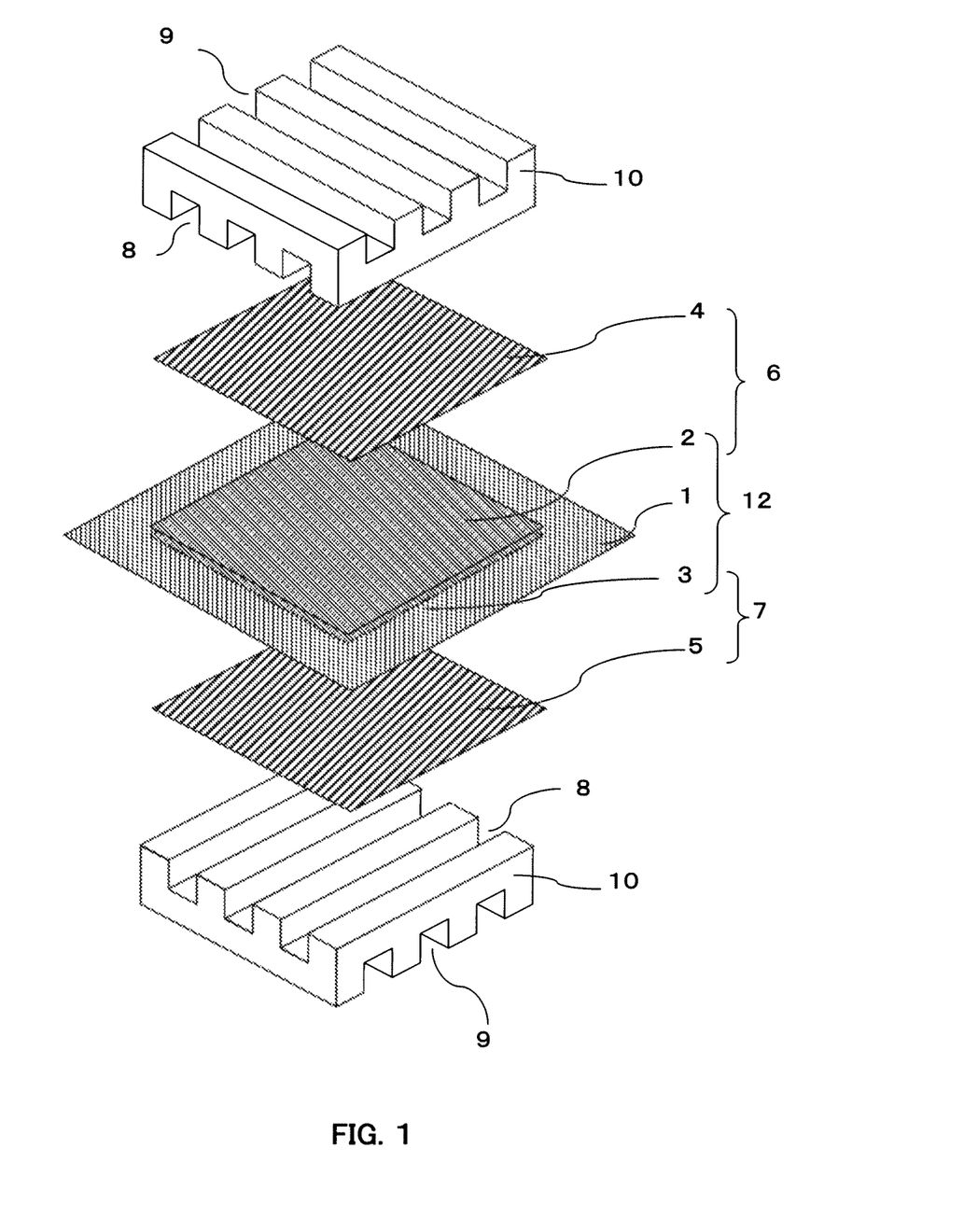
FIG. 1 is an exploded schematic diagram illustrating a single fuel cell according to an embodiment of the invention.

FIG. 1 is an exploded schematic diagram illustrating the single fuel cell 20 of the embodiment. As illustrated in FIG. 1, in the single fuel cell 20 of the embodiment, a cathode catalyst layer 2 and an anode catalyst layer 3 are disposed on both surfaces of the polymer electrolyte membrane 1 in a membrane electrode assembly 12, and a cathode gas diffusion layer 4 and an anode gas diffusion layer 5 are disposed opposite the cathode catalyst layer 2 and the anode catalyst layer 3, thereby forming an air electrode (cathode) 6 and a fuel electrode (anode) 7, respectively. A set of separators 10 is disposed, and the separator 10 is made of a conductive and impermeable material. In the separator 10, a gas flow channel 8 is formed by a rib in order to circulate gas, and a cooling water flow channel 9 that circulates cooling water is formed in a surface opposite to the surface in which the gas flow channel 8 is formed. For example, gas containing oxygen is supplied as an oxidant gas from the gas flow channel 8 of the separator 10 on the side of the cathode 6. On the other hand, for example, hydrogen is supplied as a fuel gas from the gas flow channel 8 of the separator 10 on the side of the anode 7. An electrode reaction of the hydrogen as the fuel gas with the oxygen is performed in the presence of a catalyst, which allows an electromotive force to be generated between the cathode 6 and the anode 7.

The PEFC (or PEMFC) of FIG. 1 is a single fuel cell. However, in the embodiment, plural fuel cells can also be stacked in series with the separators 10 interposed therebetween to form a fuel cell stack.

An effective area 13 of the gas flow channel of the separator 10 of the embodiment will be described below.

Figure 2:
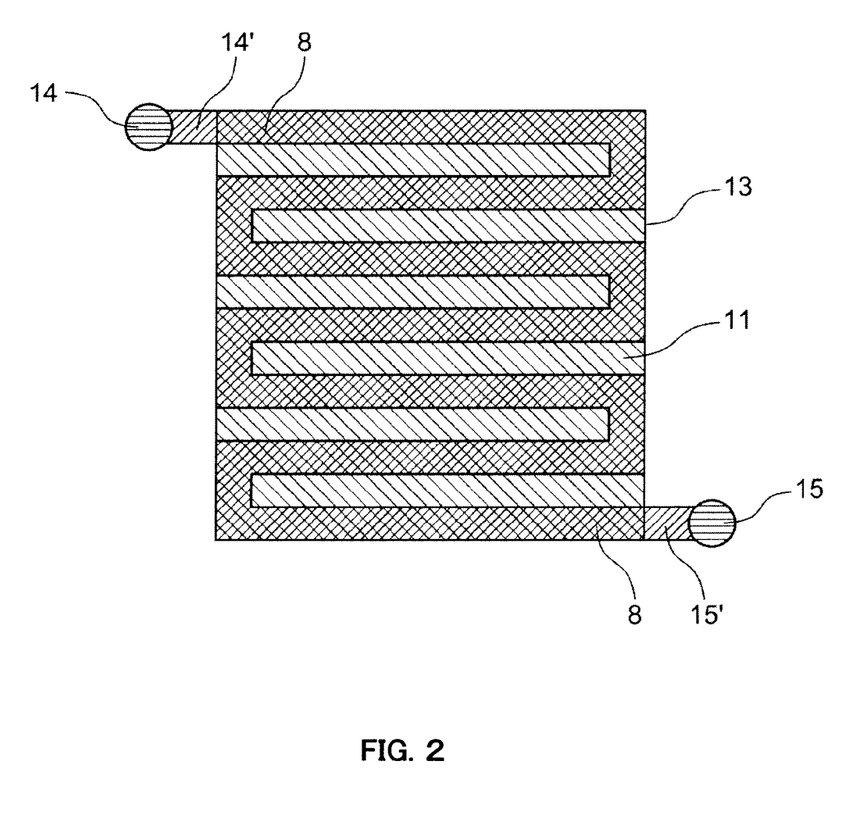
FIG. 2 is a schematic sectional view illustrating an effective area of a gas flow channel of a separator according to an embodiment of the invention.

FIG. 2 is a schematic sectional view illustrating the effective area 13 of the gas flow channel of the separator 10 of the embodiment. As illustrated in FIG. 2, an effective area 13 of the gas flow channel including a rib 11 of the separator 10 of the embodiment is defined as an area which is specified by tracing and connecting outermost edge parts of a groove of the gas flow channel 8 of the separators 10 and corresponds to a maximum region where the gas can be stably supplied, except a portion of a gas inlet port 14, a portion of a gas outlet port 15, a joint part 14' of the gas inlet port, and a joint part 15' of the gas outlet port.

A magnitude relation between the effective area of the gas flow channel 8 of the separator 10 of the embodiment and the area of the gas diffusion layer will be described below.

The single fuel cell 20 includes the membrane electrode assembly 12 in which the pair of electrode catalyst layers (the cathode catalyst layer 2 and the anode catalyst layer 3) is provided on both the surfaces of the polymer electrolyte membrane 1, the single fuel cell 20 includes the pair of separators 10 for the cathode 6 and the anode 7, the pair of gas diffusion layers (the cathode gas diffusion layer 4 and the anode gas diffusion layer 5) is disposed opposite the pair of electrode catalyst layers of the membrane electrode assembly 12, and the flow channels are formed such that the membrane electrode assembly 12 and the pair of gas diffusion layers are sandwiched between the pair of separators 10. As to the effective area of the gas flow channel 8 of the embodiment and the area of the gas diffusion layer, the area of one of the gas diffusion layers of the cathode 6 and anode 7 is smaller than the effective area of the gas flow channel 8 of the separator 10, which is specified by tracing and connecting outermost edge parts of a groove of the gas flow channel 8 of the separators 10.

In the single fuel cell 20 of the embodiment, because the area of one of the gas diffusion layers of the cathode 6 and anode 7 is set smaller than the effective area of the gas flow channel 8 of the separator 10, which is specified by tracing and connecting outermost edge parts of a groove of the gas flow channel 8 of the separators 10, excess water generated by the electrode reaction can easily be discharged outside the single fuel cell 20, and the excess water is discharged even if a small amount of gas is supplied to the cathode 6. Therefore, a gas flow rate can be reduced, and the cost of the gas diffusion layer can be reduced compared with the single fuel cell in which the gas diffusion layer having the conventional effective area is used. That is, the single fuel cell 20 exhibiting the good power generation performance can be obtained.

Figure 3A:
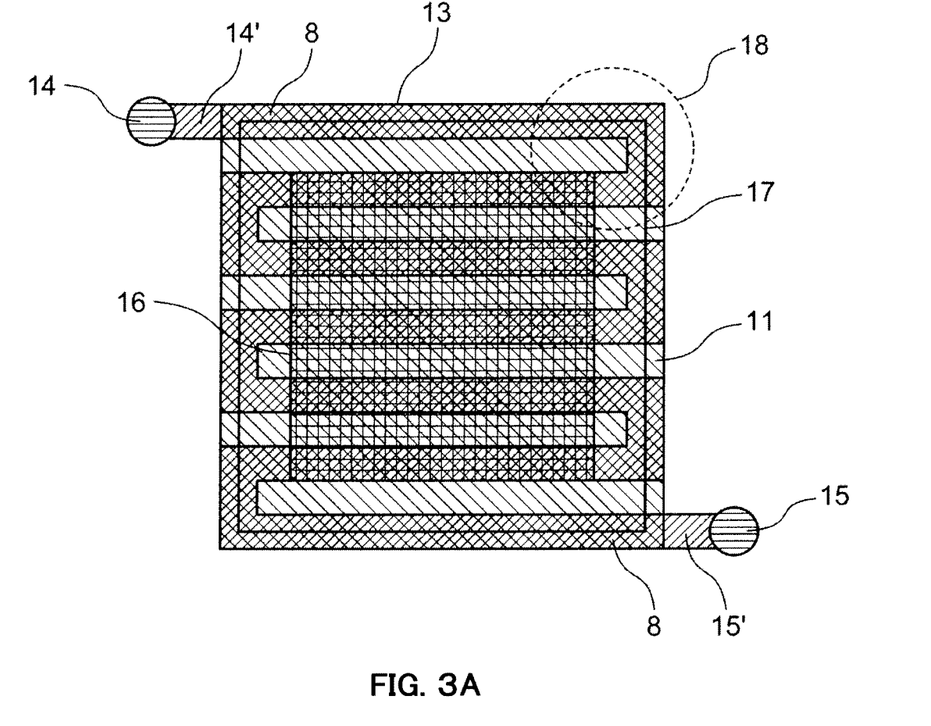
FIG. 3A is a schematic sectional view illustrating a magnitude relation between an effective area of the gas flow channel of the separator and an area of a gas diffusion layer according to an embodiment of the invention.
Figure 3B:
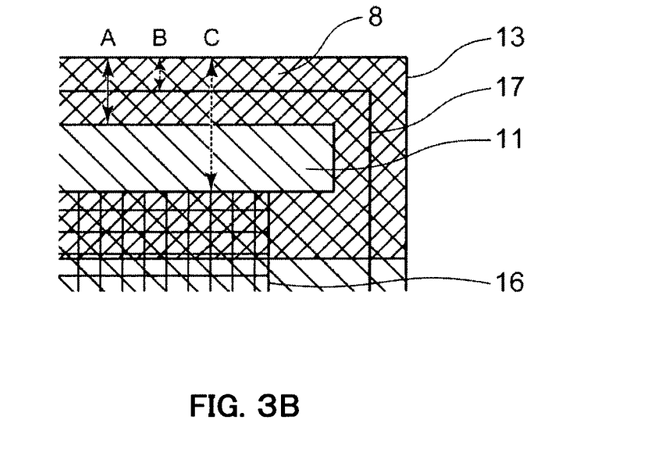
FIG. 3B is a schematic enlarged sectional view of a circular dotted-line portion of FIG. 3A.

FIGS. 3A and 3B are schematic sectional views illustrating the magnitude relation between the effective area of the gas flow channel 8 of the separator 10 of the embodiment and the gas diffusion layer. FIG. 3A illustrates the magnitude relation between the effective area of the gas flow channel 8 and the area of the gas diffusion layer in all the four sides in the effective area 13 of the gas flow channel including the rib 11, and FIG. 3B is a schematic enlarged sectional view of a circular dotted-line portion of FIG. 3A.

As illustrated in FIG. 3A, when the magnitude relation is applied to all the four sides in the effective area 13 of the gas flow channel of the embodiment, the gas diffusion layer of the embodiment is larger than a minimum gas diffusion layer 16 and smaller than a maximum gas diffusion layer 17.

The detailed magnitude relation will be described with reference to FIG. 3B. FIG. 3B illustrates an enlarged region 18 of FIG. 3A. It is assumed that X is a distance to the closest gas diffusion layer from each point on one side of the effective area 13 of the gas flow channel 8 surrounded by connecting the groove end portions located outermost the gas flow channel, that A is a groove width of the gas flow channel 8 located outermost the effective area 13 of the gas flow channel, and that B is 50%×A while C is 200%×A. The distance X to the closest gas diffusion layer from each point on one side of the effective area 13 of the gas flow channel of the embodiment is defined so as to satisfy the range of B≤X≤C. Therefore, at least one of the sides of the gas diffusion layer of the embodiment exists in the range larger than the minimum gas diffusion layer 16 and smaller than the maximum gas diffusion layer 17.

The conventional gas diffusion layer is disposed such that the effective area of the gas flow channel is covered therewith, and the conventional gas diffusion layer is incorporated in the single fuel cell of the PEFC (or PEMFC). In the conventional gas diffusion layer, when the excess water generated by the reaction remains in the membrane electrode assembly, the flooding is generated to decrease the gas diffusivity, and the fuel efficiency is degraded, thereby degrading the power generation performance of the single fuel cell. Additionally, the excess water generated in the cathode remains in the separator flow channel to generate the plugging, and therefore the gas supply is disturbed to degrade the power generation performance of the single fuel cell.

On the other hand, in the embodiment, the distance X is defined so as to satisfy the range of B≤X≤C, thereby forming a negative pressure portion that is not covered with the gas diffusion layer and a positive pressure portion that is covered with the gas diffusion layer in the gas flow channel 8 of the separator 10. The gas flows easily from the positive pressure to the negative pressure due to a pressure difference to promote the gas flow from the portion that is covered with the gas diffusion layer to the portion that is not covered with the gas diffusion layer. As a result, the discharge of the excess water is assisted in or near the gas flow channel portion that is not covered with the gas diffusion layer, so that the flooding and the plugging can be suppressed. The effect can be achieved by the presence of at least one of the sides of the gas diffusion layer in the range larger than the minimum gas diffusion layer 16 and smaller than the maximum gas diffusion layer 17. The effect can be achieved better by the presence of all the four sides of the gas diffusion layer in the range larger than the minimum gas diffusion layer 16 and smaller than the maximum gas diffusion layer 17.

Figure 4:
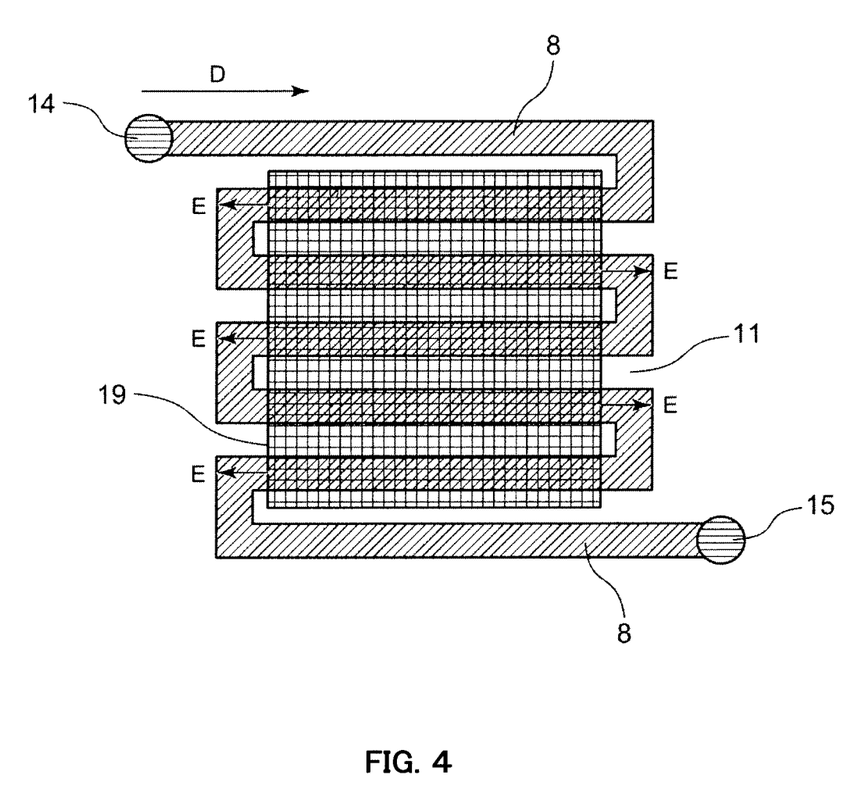
FIG. 4 is a schematic sectional view illustrating a gas flow according to an embodiment of the invention.

FIG. 4 is a schematic sectional view illustrating a gas flow of the embodiment. As illustrated in FIG. 4, in the embodiment, the gas entering the gas inlet port 14 proceeds in the gas flow channel 8 along a gas flow D. Then the gas enters an actual gas diffusion layer 19. When the gas goes out from the actual gas diffusion layer 19, the gas flow D is promoted by a flow E from the positive pressure to the negative pressure. The flow E from the positive pressure to the negative pressure is generated by the pressure difference between the positive pressure portion that is covered with the gas diffusion layer and the negative pressure portion that is not covered with the gas diffusion layer. As a result, the discharge of the excess water is assisted in or near the gas flow channel portion that is not covered with the gas diffusion layer, so that the flooding and the plugging can be suppressed.

When the distance X to the closest gas diffusion layer from each point on one side of the effective area 13 of the gas flow channel is smaller than the groove width A×50% of the gas flow channel located outermost the effective area 13 of the gas flow channel, the negative pressure portion is reduced, and the effect of the gas flow promoted by the flow E from the positive pressure to the negative pressure is insufficiently exerted, the gas whose flow velocity is increased diffuses to the side of the polymer electrolyte membrane 1 that is in contact with the gas flow channel 8, and occasionally the gas utilization is degraded or the membrane breaks to generate cross-leakage. On the other hand, when the distance X to the closest gas diffusion layer from each point on one side of the effective area 13 of the gas flow channel is larger than the groove width A×200% of the gas flow channel located outermost the effective area 13 of the gas flow channel, occasionally the gas diffuses insufficiently from the gas diffusion layer to the catalyst layer. Further, because of the increased area where the gas comes into direct contact with the membrane, occasionally the membrane breaks to generate cross-leakage.

In the single fuel cell 20 of the embodiment, preferably the groove width of the gas flow channel 8 located outermost the effective area 13 of the gas flow channel ranges from 0.1 mm to 5 mm.

When the groove width of the gas flow channel 8 located outermost the effective area 13 of the gas flow channel is smaller than 0.1 mm, the water generated by the reaction is hardly discharged, or occasionally an internal pressure is increased more than necessary because the gas hardly flows. On the other hand, when the groove width of the gas flow channel 8 located outermost the effective area 13 of the gas flow channel is larger than 5 mm, occasionally the gas does not flow constant at the low gas flow rate, and occasionally the power generation performance is degraded because the gas utilization is decreased. The gas diffusivity is decreased at the high gas flow rate.

In the single fuel cell 20 of the embodiment, preferably the gas flow channel 8 of the separator 10 has the uniform groove width from a starting point of the gas flow channel 8 to a terminal point. When the gas flow channel 8 of the separator 10 has the uniform groove width from the starting point of the gas flow channel 8 to the terminal point, the gas diffuses uniformly and the gas utilization is not decreased, so that the power generation performance can be improved. On the other hand, the gas flow channel 8 of the separator 10 having the nonuniform groove width may be used. However, occasionally the gas does not run uniformly through the surface because of the nonuniform groove width.

In the single fuel cell 20 of the embodiment, preferably the gas flow channel 8 of the separator 10 is formed into a serpentine shape. However, any gas flow channel structure may be used as long as the fuel gas and the oxidant gas flow through the predetermined electrode area. Examples of the gas flow channel structure include a parallel type structure, a parallel serpentine structure, and a grid type structure.

The single fuel cell 20 and membrane electrode assembly 12 of the embodiment will be described in detail below.

Any material may be used as the gas diffusion layer (the cathode gas diffusion layer 4 and the anode gas diffusion layer 5) of the embodiment as long as the material has both the gas diffusivity and the conductivity. Examples of the material include carbon paper, carbon cloth, and porous carbon materials such as nonwoven cloth. The gas diffusion layer may previously be subjected to a water repellent treatment, or an MPL (Micro Porous Layer) may be formed on the gas diffusion layer subjected to the water repellent treatment. The gas diffusion layer subjected to the water repellent treatment or the gas diffusion layer with the MPL may be used in either the cathode 6 or the anode 7.

The gas diffusion layer is dipped in a solution in which fluorine resin is dispersed and the gas diffusion layer is sintered at a temperature of a melting point of the fluorine resin or more, which allows the gas diffusion layer to be subjected to the water repellent treatment. For example, PTFE (polytetrafluoroethylene) can be used as the fluorine resin. The gas diffusion layer subjected to the water repellent treatment efficiently discharges the excess water in the membrane electrode assembly 12.

Kneading of carbon particles and the fluorine resin is performed and the mixture is sintered at the temperature of the melting point of the fluorine resin or more, which allows the MPL to be formed. For example, PTFE can be used as the fluorine resin. The MPL can prevent catalyst ink from seeping into the gas diffusion layer, and the fluorine resin with carbon particles is deposited on the MPL to form a three-phase interface even if a small amount of the fluorine resin with carbon particles is applied. The MPL maintains the larger amount of water in the polymer electrolyte membrane 1, or efficiently discharges the excess water in the membrane electrode assembly 12.

Basically the MPL is provided to the electrode catalyst layer (the cathode catalyst layer 2 and the anode catalyst layer 3) side in the gas diffusion layer, and is used to manage the discharge or retention of the water. Alternatively, the MPL is also provided onto the separator side of the gas diffusion layer, and the MPLs may be provided on both the surfaces of the gas diffusion layer. When the MPL is provided to the gas diffusion layer of the separator side, the water discharge effect is improved, and contact between the gas diffusion layer and the separator is improved to advantageously decrease a cell resistance.

The discharge and retention of the water in the gas diffusion layer depend on a crush degree of the gas diffusion layer base material incorporated in the single fuel cell 20. The crush degree of the gas diffusion layer base material depends on a thickness of a gasket used to prevent the leakage of the fuel gas from the single fuel cell 20 and a tightening degree of a single fuel cell. However, in the embodiment, the discharge and retention of the water in the gas diffusion layer do not depend on the crush degree of the gas diffusion layer base material.

The separator 10 of the embodiment includes the gas flow channel 8 in order to supply the fuel gas, and any material may be used as long as the material acts as a collector. The base material of the separator 10 is classified into a non-metallic system material and a metallic system material. Examples of the non-metallic system material include carbon materials such as dense carbon graphite and resin material. Examples of the metallic system material include stainless steel (SUS), titanium, and aluminum. The gas diffusion layer and the separator may be integrally formed. In the metallic system material, conductive resin may be coated for the purpose of corrosion protection.

Any material having the proton conductivity may be used as the polymer electrolyte membrane 1 used in the membrane electrode assembly 12 of the embodiment. For example, a fluorine-based polymer electrolyte and a hydrocarbon-based polymer electrolyte can be used as the polymer electrolyte membrane 1. Examples of the fluorine-based polymer electrolyte include Nafion (registered trademark, manufactured by Du Pont), Flemion (registered trademark, manufactured by ASAHI GLASS CO., LTD.), Aciplex (registered trademark, manufactured by Asahi KASEI Cooperation), and Gore Select (registered trademark, manufactured by Japan Gore-Tex Inc.). Examples of the hydrocarbon-based polymer electrolyte include sulfonated polyether ketone, sulfonated polyether sulfone, sulfonated polyether ether sulfone, sulfonated polysulfide, and sulfonated polyphenylene. Among others, preferably the Nafion (registered trademark, manufactured by Du Pont)-based materials can be used as the polymer electrolyte membrane 1.

In the membrane electrode assembly 12 of the embodiment, the pair of electrode catalyst layers is formed on both the surfaces of the polymer electrolyte membrane 1 using the catalyst ink. The catalyst ink contains at least an electron-conductive material which is loaded with the catalyst, a polymer electrolyte, and a solvent.

Any material having the proton conductivity may be used as the polymer electrolyte contained in the catalyst ink of the embodiment, and the materials similar to those of the polymer electrolyte membrane 1 can be used. Specifically, the fluorine-based polymer electrolyte and the hydrocarbon-based polymer electrolyte can be used. For example, the Nafion (registered trademark, manufactured by Du Pont)-based materials can be used as the fluorine-based polymer electrolyte. Examples of the hydrocarbon-based polymer electrolyte membrane include sulfonated polyether ketone, sulfonated polyether sulfone, sulfonated polyether ether sulfone, sulfonated polysulfide, and sulfonated polyphenylene. Among others, preferably the Nafion (registered trademark, manufactured by Du Pont)-based materials can be used as the polymer electrolyte membrane 1. Preferably the same material as the polymer electrolyte membrane 1 is used in consideration of adhesion between the electrode catalyst layer and the polymer electrolyte membrane 1.

Examples of the catalyst material used in the embodiment include, in addition to platinum group elements such as platinum, palladium, ruthenium, iridium, rhodium, and osmium, metals such as iron, lead, copper, chromium, cobalt, nickel, manganese, vanadium, molybdenum, gallium, and aluminum, and alloys, oxides, and composite oxides thereof. Preferably a particle diameter of the catalyst ranges from 0.5 μm to 1 μm, and more preferably from 1 nm to 5 nm.

Usually carbon particles are used as the electron-conductive material which is loaded with the catalyst. Any kind of the carbon particles may be used as long as the carbon particles formed into a fine-grained shape have the conductivity while not being attacked by the catalyst. Examples of the carbon particles include carbon black, graphite, black lead, activated carbon, carbon fiber, carbon nanotube, and fullerene. Preferably the particle diameter of the carbon particle ranges from 10 nm to 1000 nm, and more preferably from 10 nm to 100 nm. When the particle diameter of the carbon particle is smaller than 10 nm, the electron-conductive path is hardly formed. On the other hand, when the particle diameter of the carbon particle is larger than 1000 nm, the gas diffusivity of the electrode catalyst layer is degraded to reduce the catalyst utilization. It is not always necessary that the electron-conductive material is loaded with the catalyst. The electron-conductive material and the catalyst may be merely mixed.

There is no particular limitation to the solvent used as a dispersion medium of the catalyst ink, as long as the solvent does not erode the electron-conductive material which is loaded with the catalyst or the polymer electrolyte, and as long as the polymer electrolyte can be dissolved or dispersed as fine gel in the solvent while having high fluidity.

For the catalyst ink, a dispersion treatment is performed if needed. A viscosity and a particle size of the catalyst ink can be controlled by a dispersion treatment condition of the catalyst ink. The dispersion treatment can be performed with various machines. A treatment with a ball mill or a roll mill, a treatment with a shear mill, a treatment with a wet type mill, and an ultrasonic dispersion treatment can be cited as an example of the dispersion treatment. A homogenizer that performs agitation by a centrifugal force may be used in the dispersion treatment.

Preferably a solid content in the catalyst ink ranges from 0.1% by mass to 50% by mass. When the solid content in the catalyst ink is more than 50% by mass, a crack is easily generated in the surface of the electrode catalyst layer because of the increased viscosity of the catalyst ink. On the other hand, when the solid content in the catalyst ink is lower than 0.1% by mass, a film deposition rate is too slow, and productivity is reduced. Preferably the viscosity of the catalyst ink ranges from 0.1 cP to 2000 cP, and more preferably from 5 cP to 100 cP.

There are many methods for producing the membrane electrode assembly 12 from the catalyst ink. However, the method of the embodiment differs from the conventional methods for producing the membrane electrode assembly 12. For example, in the method for producing the membrane electrode assembly 12 of the embodiment, the catalyst ink is applied onto the base material selected from a transfer sheet (decal substrate) and the gas diffusion layer, the applied film is dried to form the electrode catalyst layer on the base material, the electrode catalyst layer on the base material and the polymer electrolyte membrane are hot-pressed, and the transfer sheet is peeled off to obtain the membrane electrode assembly 12 when the base material is the transfer sheet. In another method, the catalyst ink is directly applied to the polymer electrolyte membrane, dried, and hot-pressed, thereby obtaining the membrane electrode assembly 12.

The case in which the membrane electrode assembly 12 is produced using the transfer sheet as the base material will be described below. A material having a good transfer property can be used as the transfer sheet. When the transfer sheet is used as the base material, the transfer sheet is peeled off after the electrode catalyst layer adheres to the polymer electrolyte membrane 1, thereby obtaining the membrane electrode assembly 12 that includes the pair of electrode catalyst layers on both the surfaces of the polymer electrolyte membrane 1. The transfer sheet to which a parting agent adheres may be used.

Examples of the catalyst ink applying method include a doctor blade method, a dipping method, a screen print method, a roll coating method, and a spray method.

There is no particular limitation to a temperature in the drying process. However, preferably the drying process is performed in the range of (base material temperature)° C. to 150° C. When the temperature in the drying process is higher than 150° C., the uneven drying of the electrode catalyst layer is generated or an influence of a heat treatment on the polymer electrolyte membrane 1 becomes unsuitably increased. When the temperature in the drying process is not lower than a boiling point of the solvent in the catalyst ink, an evaporation rate is remarkably increased. Therefore, preferably the temperature in the drying process is lower than the boiling point of the solvent.

Any film may be used as a protective film used in the hot press process as long as the film does not apply an unnecessary stress to the base material, the electrode catalyst layer, or the polymer electrolyte membrane during the hot press while smoothness of the film is maintained. A press member inserted in the outside of the protective film is used to evenly apply the pressure and temperature to the surface and acts as a buffer material. Any material may be used as the press member as long as the material does not apply the unnecessary stress to the base material to which the catalyst is applied, the electrode catalyst layer, or the polymer electrolyte membrane during the hot press while the smoothness of the press member is maintained.

In the hot press process, a press pressure applied to the polymer electrolyte membrane and electrode catalyst layer has an influence on cell performance of the membrane electrode assembly. In order to obtain the membrane electrode assembly having the good cell performance, preferably the press pressure applied to the polymer electrolyte membrane and electrode catalyst layer ranges from 0.5 MPa to 20 MPa, and more preferably from 1 MPa to 15 MPa. When the press pressure is higher than 20 MPa, the electrode catalyst layer is excessively contracted to reduce the cell performance. When the press pressure is lower than 0.5 MPa, the adhesion between the electrode catalyst layer and the polymer electrolyte membrane is degraded to reduce the cell performance.

Preferably a hot press temperature is set to neighborhoods of glass-transition points (Tg) of the polymer electrolyte membrane 1 and the polymer electrolyte of the electrode catalyst layer. Specifically, preferably the hot press temperature ranges from the glass-transition point of the polymer electrolyte membrane 1−40° C. (Tg−40° C.) to the glass-transition point of the polymer electrolyte membrane 1+60° C. (Tg+60° C.). When the hot press temperature is lower than the glass-transition point of the polymer electrolyte membrane 1−40° C. (Tg−40° C.), the interface adhesion is insufficient between the electrode catalyst layer and the polymer electrolyte membrane 1 to reduce the cell performance. On the other hand, when the hot press temperature is higher than the glass-transition point of the polymer electrolyte membrane 1+60° C. (Tg+60° C.), the polymer electrolyte is softened to break voids of the electrode catalyst layer, and therefore the diffusivity of the gas or generated water is decreased to reduce the cell performance.

EXAMPLE

The single fuel cell 20 of the invention will be described below by way of specific example. However, the invention is not limited to the following example.
(Preparation of Catalyst Ink)

The platinum loaded (platinum supported) carbon catalyst having a platinum loaded amount of 60% by weight and Nafion (registered trademark, manufactured by Du Pont) that is a 20% by mass polymer electrolyte solution were mixed using a water-ethanol mixed solvent having a mixture ratio of 1:2, and the dispersion treatment was performed with a planetary ball mill to prepare the catalyst ink.
(Method for Producing Electrode Catalyst Layer)

The base material was fixed onto a plate, and the catalyst ink was applied onto the base material with the doctor blade. The base material on which the coating film made of the catalyst ink was formed was put in an oven (hot-air circulating isothermal drying machine 41-S5H, manufactured by SATAKE CHEMICAL EQUIPMENT MFG., LTD.), and an oven temperature was set to 50° C. to dry the base material for 5 minutes, thereby producing the electrode catalyst layer on the transfer sheet that was the base material. The platinum loaded amount of the cathode catalyst layer 2 was adjusted to about 0.5 mg/cm$^2$ while that of the anode catalyst layer 3 was adjusted to about 0.3 mg/cm$^2$.
(Method for Producing Membrane Electrode Assembly 12)

The transfer sheet in which the electrode catalyst layer was formed was cut into two sheets each of which had an area of 25 cm$^2$. The base material was disposed such that the electrode catalyst layers were opposite both the surfaces of the polymer electrolyte membrane 1, and the transfer sheet and the polymer electrolyte membrane 1 in which the electrode catalyst layers were formed were sandwiched from both sides by the protective films. The press members were inserted in both sides of the protective films, and the transfer sheet and the polymer electrolyte membrane 1 were placed on the hot press and hot-pressed under the conditions of the press temperature of 130° C., the press time of 10 minutes, and the press pressure of 7.8 MPa. After the hot press, the transfer sheet was peeled off to obtain the membrane electrode assembly 12.
(Each Detailed Member of Single Fuel Cell)

The polymer electrolyte membrane, the gas diffusion layer, and the power generation cell used are as follows:
    polymer electrolyte membrane: Nafion 212 membrane
      (registered trademark, manufactured by Du Pont)
    gas diffusion layer: carbon paper (manufactured by Toray
      Industries, Inc.) subjected to the MPL treatment
    power generation cell: JARI standard cell (for 25 cm$^2$)

Figure 5:
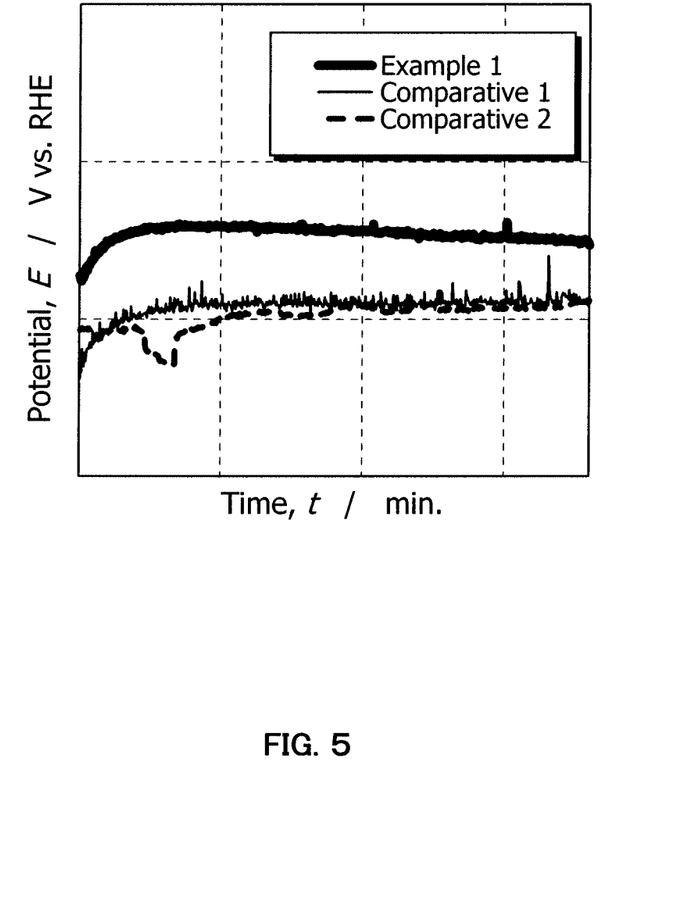
FIG. 5 illustrates power generation characteristics of single fuel cells of Example and Comparative examples of the invention.

(Effective Area and Specifications of Separator)
  effective area of separator: height of 53 mm×width of 52 mm (2756 mm$^2$)
  gas flow channel width of separator: 1 mm
  rib width of separator: 1 mm
(Area of Gas Diffusion Layer)
  Example 1 height of 50 mm×width of 50 mm (2500 mm$^2$)
  Comparative example 1 height of 54 mm×width of 54 mm (2916 mm$^2$)
  Comparative example 2 height of 46 mm×width of 46 mm (2116 mm$^2$)
  Each gas diffusion layer was placed so as to be located in the center of the effective area of the separator 10. That is, in Example 1, the distance X to the closest gas diffusion layer from each point on one side of the effective area 13 of the gas flow channel is X=15 mm in the height direction and X=10 mm in the width direction.
(Area of Electrode Catalyst Layer)
  Example 1 height of 50 mm×width of 50 mm (2500 mm$^2$)
  Comparative example 1 height of 50 mm×width of 50 mm (2500 mm$^2$)
  Comparative example 2 height of 46 mm×width of 46 mm (2116 mm$^2$)
  Similarly to the gas diffusion layer, each electrode catalyst layer was placed so as to be located in the center of the effective area of the separator 10.
(Power Generation Evaluating Method)
  evaluation apparatus: fuel cell evaluation system (manufactured by NF Corporation)
  fuel gas: anode hydrogen/cathode air
  gas flow rate condition: constant utilization (anode 75%/cathode 55%)
  humidification condition: anode 70° C./cell 70° C./cathode 70° C.
  current control condition: retained at 0.3 A/cm$^2$ for a constant time (current is divided by area of electrode catalyst layer to normalize current)
[Measurement Result]
  FIG. 5 is a graph of a voltage behavior in which the current is retained at 0.3 A/cm$^2$. In FIG. 5, a vertical axis indicates a potential (V) and a horizontal axis indicates a time (minute).

As can be seen from FIG. 5, in Example 1, the same current amount is obtained with the voltage higher than those of Comparative examples 1 and 2 over the whole time range from the power generation start. Additionally, the voltage behavior of Example 1 has a variation smaller than those of Comparative examples 1 and 2. Therefore, the water diffusivity in which the discharge of the excess water generated by the electrode reaction is promoted while the excess water is stably discharged to the outside of the single fuel cell 20, and the gas diffusivity in which the disturbance of the gas (the fuel gas and the oxidant gas) supply caused by the excess water is reduced are favorable in Example 1. That is, the single fuel cell 20 of Example 1 is better than the single fuel cell of Comparative example 2 in the power generation performance.

Similarly, when Example 1 and Comparative example 2 are compared, Example 1 retains the voltage higher than that of Comparative example 2. This is attributed to the fact that the gas diffusivity is improved as a result of the promotion of the discharge of the water generated by the electrode reaction.

In Example 1, the distance X to the closest gas diffusion layer from each point on one side of the effective area 13 of the gas flow channel becomes X=15 mm in the height direction and X=10 mm in the width direction. Because the gas flow channel 8 located outermost the effective area 13 of the gas flow channel has the groove width A of 1 mm, 50%× A=0.5 mm and 200%×A=2 mm are obtained. Therefore, in the effective area 13 of the gas flow channel of the separator 10, which is specified by tracing and connecting outermost edge parts of a groove of the gas flow channel 8 of the separators 10, the distance X to the closest gas diffusion layer from each point on one side of the effective area 13 of the gas flow channel falls within the range of 50%×A≤X≤200%×A in at least one side and all the four sides.

In such cases, it is also considered that the gas diffusivity is improved because the flow E from the positive pressure to the negative pressure is generated to work well in the water discharge. The flow E from the positive pressure to the negative pressure is produced by the negative pressure portion that is not covered with the gas diffusion layer and the positive pressure portion that is covered with the gas diffusion layer in the gas flow channel 8 of the separator 10.

In Comparative example 1, because the gas diffusion layer is larger than the effective area 13 of the gas flow channel, the effective area 13 of the gas flow channel is completely covered with the gas diffusion layer. Therefore, the water discharge is not improved because the flow E from the positive pressure to the negative pressure is not generated.

In Comparative example 2, the distance X to the closest gas diffusion layer from each point on one side of the effective area 13 of the gas flow channel becomes X=3.5 mm in the height direction and X=3.0 mm in the width direction. Assuming that A is a groove width of the gas flow channel 8 located outermost the effective area 13 of the gas flow channel, the distance X falls within the range of X>200%×A in all the four sides. In this case, compared with the case in which the distance X falls within the range of 50%×A≤X≤200%×A, the area of the negative pressure portion that is not covered with the gas diffusion layer becomes larger, and the area of the positive pressure portion that is covered with the gas diffusion layer becomes smaller. Therefore, it is considered that the flow E from the positive pressure to the negative pressure is weakened and does not work well in the water discharge.

As can be seen from these results, in one side and all the four sides in the effective area 13 of the gas flow channel of the separator, which is specified by tracing and connecting outermost edge parts of a groove of the gas flow channel 8 of the separators 10, the single fuel cell 20 in which the power generation performance is improved is obtained when the distance X to the closest gas diffusion layer from each point on one side of the effective area of the gas flow channel falls within the range of 50%×A (groove width of the gas flow channel located outermost the effective area)≤X≤200%×A (groove width of the gas flow channel located outermost the effective area).

In the single fuel cell 20 of the invention, the water diffusivity in which the discharge of the excess water generated by the electrode reaction is promoted while the excess water is stably discharged to the outside of the single fuel cell 20 and the gas diffusivity in which the disturbance of the gas (fuel gas and oxidant gas) supply caused by the excess water is reduced are favorable, so that the power generation performance can be improved. In the invention, the gas diffusion layer that is smaller than the gas diffusion layer of the conventional single fuel cell is used because the area of the gas diffusion layer is formed smaller than the effective area of the gas flow channel 8 of the separator 10. Therefore, the cost of the gas diffusion layer can be reduced. Further, because the excess water generated by the electrode reaction is easily discharged to the outside of the single fuel cell 20, the excess water is discharged even if the small amount of gas is supplied to the cathode 6. Therefore, gas flow rate can be decreased.

INDUSTRIAL APPLICABILITY

The invention can suitably be applied to the fuel cell, particularly to the single fuel cell or the fuel cell stack in the household fuel cell system and the fuel-cell vehicle.

What is claimed is:

1. A single fuel cell comprising:
a membrane electrode assembly;
gas diffusion layers; and
separators, the gas diffusion layers including a cathode gas diffusion layer and an anode gas diffusion layer, the separators including a cathode separator and an anode separator each of which has ribs and a groove of a gas flow channel on one of the surfaces, a pair of electrode catalyst layers being provided on both surfaces of a polymer electrolyte membrane in the membrane electrode assembly, the gas diffusion layers being disposed opposite the pair of electrode catalyst layers of the membrane electrode assembly, the membrane electrode assembly and the gas diffusion layers being interposed between the separators, a total area on a surface of the cathode gas diffusion layer being smaller than an effective area of the gas flow channel including the ribs of the cathode separator and/or a total area on a surface of the anode gas diffusion layer being smaller than an effective area of the gas flow channel including the ribs of the anode separator, and the effective area of the gas flow channel including the ribs being defined as an inner area specified by tracing and connecting outermost edge parts of the groove.

2. The single fuel cell according to claim 1, wherein X is the distance closest to the gas diffusion layer from the outer circumference of the effective area of the gas flow channel of the separator, the distance X falls within a range of 50%×(a groove width of the gas flow channel located outermost the effective area of the gas flow channel)≤X≤200%×(the groove width of the gas flow channel located outermost the effective area of the gas flow channel).

3. The single fuel cell according to claim 2, wherein the groove width of the gas flow channel located at an outermost area of the effective area of the gas flow channel ranges from 0.1 mm to 5 mm.

4. The single fuel cell according to claim 3, wherein the gas flow channel of the separator has a uniform groove width from a starting point of the gas flow channel to a terminal point thereof.

5. The single fuel cell according to claim 4, wherein the gas flow channel of the separator is formed into a serpentine shape.

6. A fuel cell stack comprising the plurality of single fuel cells according to claim 5, wherein the single fuel cells are stacked in series.

7. The single fuel cell according to claim 1, wherein, each the gas diffusion layer and the effective area of the gas flow channel of the separator is rectangular in shape, X is a distance closest to the gas diffusion layer from one of the four sides of the outer circumference of the effective area of the gas flow channel of the separator, the distance X falls within a range of 50%×(a groove width of the gas flow channel located outermost the effective area of the gas flow channel)≤X≤200%×(the groove width of the gas flow channel located outermost the effective area of the gas flow channel).

8. The single fuel cell according to claim 7, wherein the groove width of the gas flow channel located at an outermost area of the effective area of the gas flow channel ranges from 0.1 mm to 5 mm.

9. The single fuel cell according to claim 8, wherein the gas flow channel of the separator has a uniform groove width from a starting point of the gas flow channel to a terminal point thereof.

10. The single fuel cell according to claim 9, wherein the gas flow channel of the separator is formed into a serpentine shape.

11. A fuel cell stack comprising the plurality of single fuel cells according to claim 10, wherein the single fuel cells are stacked in series.

12. A single fuel cell comprising:
a membrane electrode assembly;
a cathode gas diffusion layer;
a cathode separator;
an anode gas diffusion layer; and
an anode separator, a cathode catalyst layer being provided on a surface of a polymer electrolyte membrane in the membrane electrode assembly, an anode catalyst layer being provided on the other surface of the polymer electrolyte membrane in the membrane electrode assembly, the cathode gas diffusion layer being disposed on the cathode catalyst layer of the membrane electrode assembly, the anode gas diffusion layer being disposed on the anode catalyst layer of the membrane electrode assembly, the cathode separator having ribs and a groove of a cathode gas flow channel on one of the surfaces, the anode separator having ribs and a groove of an anode gas flow channel on one of the surfaces, the membrane electrode assembly, the cathode gas diffusion layer and the anode gas diffusion layer being interposed between the cathode separator and the anode separator, wherein at least one of the following conditions is satisfied: a total area which is on the cathode separator and which is covered with the cathode gas diffusion layer is smaller than and included in an effective area of the cathode gas flow channel including the ribs on the cathode separator, and a total area which is on the anode separator and which is covered with the anode gas diffusion layer is smaller than and included in an effective area of the anode gas flow channel including the ribs on the anode separator, wherein
the effective area of the cathode gas flow channel including the ribs is defined as an inner area specified by tracing and connecting outermost edge parts of the groove, and
the effective area of the anode gas flow channel including the ribs is defined as an inner area specified by tracing and connecting outermost edge parts of the groove.

13. A single fuel cell comprising:
a membrane electrode assembly;
a cathode gas diffusion layer;
a cathode separator;
an anode gas diffusion layer; and
an anode separator, a cathode catalyst layer being provided on a surface of a polymer electrolyte membrane in the membrane electrode assembly, an anode catalyst layer being provided on the other surface of the polymer electrolyte membrane in the membrane electrode assembly, the cathode gas diffusion layer being disposed on the cathode catalyst layer of the membrane electrode assembly, the anode gas diffusion layer being disposed on the anode catalyst layer of the membrane electrode assembly, the cathode separator having ribs and a groove of a cathode gas flow channel, the anode separator having ribs and a groove of an anode gas flow channel, the membrane electrode assembly, the cathode gas diffusion layer and the anode gas diffusion layer being interposed between the cathode separator and the anode separator, wherein at least one of the following conditions is satisfied:

some areas of an effective area of the cathode gas flow channel including the ribs on the cathode separator are covered with the cathode gas diffusion layer on the cathode separator while the other areas of the effective area of the cathode gas flow channel including the ribs on the cathode separator are not covered with the cathode gas diffusion layer on the cathode separator, and some areas of an effective area of the anode gas flow channel including the ribs on the anode separator are covered with the anode gas diffusion layer on the anode separator while the other areas of the effective area of the anode gas flow channel including the ribs on the anode separator are not covered with the anode gas diffusion layer on the anode separator, wherein the effective area of the cathode gas flow channel including the ribs is defined as an inner area specified by tracing and connecting outermost edge parts of the groove, and the effective area of the anode gas flow channel including the ribs is defined as an inner area specified by tracing and connecting outermost edge parts of the groove.

* * * * *